United States Patent [19]

Larsonneur

[11] Patent Number: 4,770,920

[45] Date of Patent: Sep. 13, 1988

[54] LAMINATION ANCHORING METHOD AND PRODUCT THEREOF

[75] Inventor: Lionel M. Larsonneur, Pomona, Calif.

[73] Assignee: Paper-Pak Products, Inc., La Verne, Calif.

[21] Appl. No.: 938,590

[22] Filed: Dec. 5, 1986

Related U.S. Application Data

[63] Continuation-in-part of Ser. No. 849,419, Apr. 8, 1986, Pat. No. 4,735,846.

[51] Int. Cl.⁴ ................................................ B32B 7/14
[52] U.S. Cl. .................................. 428/198; 156/280; 156/209; 156/220; 156/290; 156/291; 156/305; 156/578; 206/204; 426/124; 428/211; 428/223
[58] Field of Search ............... 156/209, 280, 290, 291, 156/305; 206/204; 426/124; 428/198, 211, 223

[56] References Cited

U.S. PATENT DOCUMENTS

| 2,518,762 | 8/1950 | Draheim | 428/198 X |
| 4,207,367 | 6/1980 | Baker | 428/198 X |
| 4,275,811 | 6/1981 | Miller | 206/204 |
| 4,321,997 | 3/1982 | Miller | 206/204 |
| 4,382,507 | 5/1983 | Miller | 206/204 |

Primary Examiner—Robert A. Dawson
Attorney, Agent, or Firm—Henry M. Bissell

[57] ABSTRACT

An absorptive laminated sheet material having improved, moisture-resistant, pressure bonded spots for locking the lamination layers together. During fabrication of the laminated product, a thermoplastic low-viscosity wax-like substance, such as melted wax or paraffin, hot melt plastic or the like, is applied in minute amounts onto juncture lines of pressure bonded spots formed in the pads. The thermoplastic material penetrates the layers of the laminated product so that, on cooling, it forms a "wax rivet" at each bonded spot, thus providing added strength for the juncture lines and rendering the layers impervious to absorbed liquid at the points of application.

46 Claims, 13 Drawing Sheets

U.S. Patent  Sep. 13, 1988  Sheet 1 of 3  4,770,920
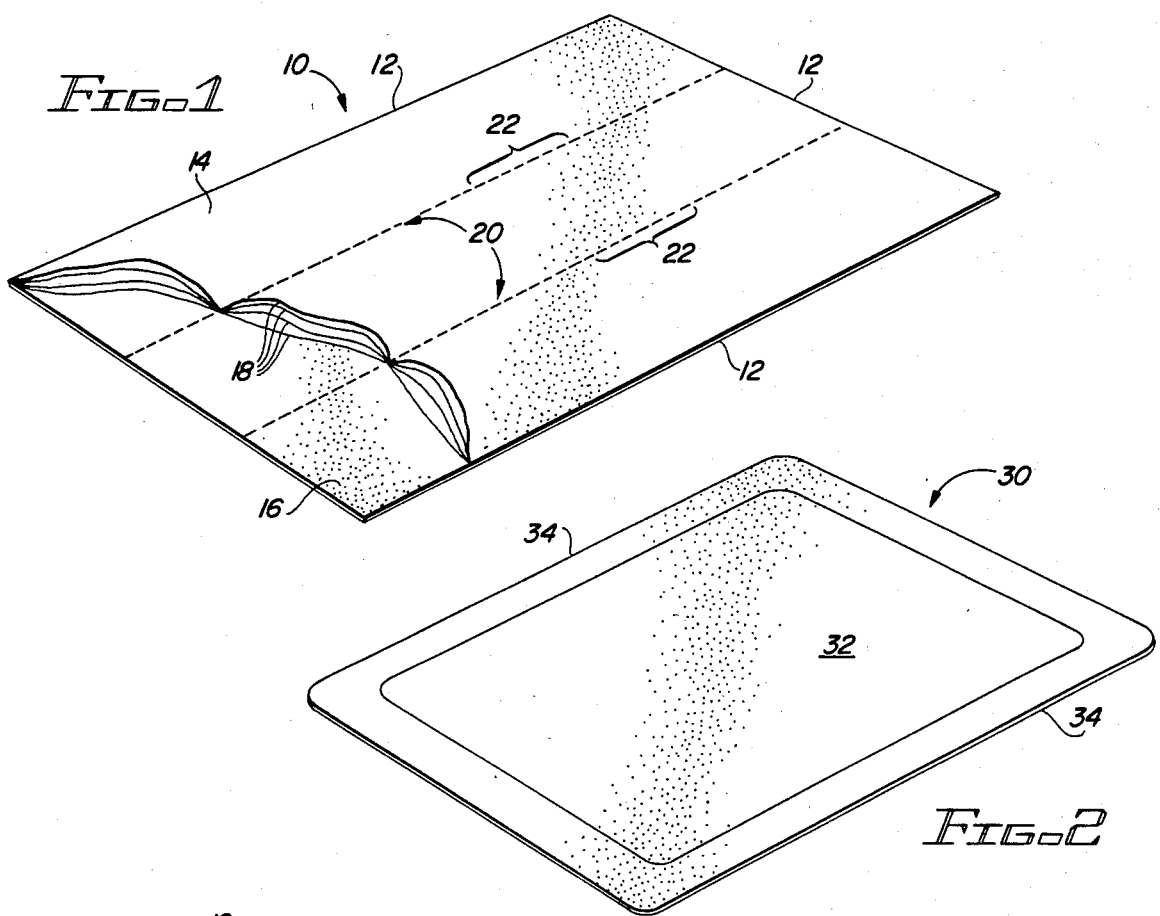
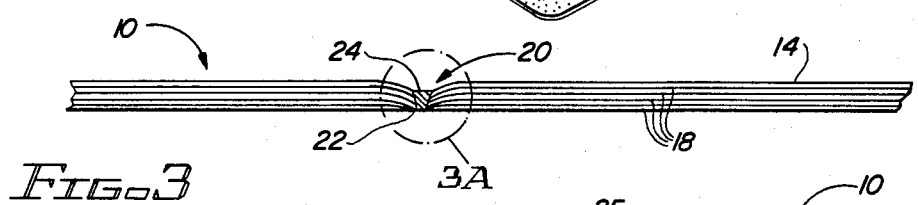
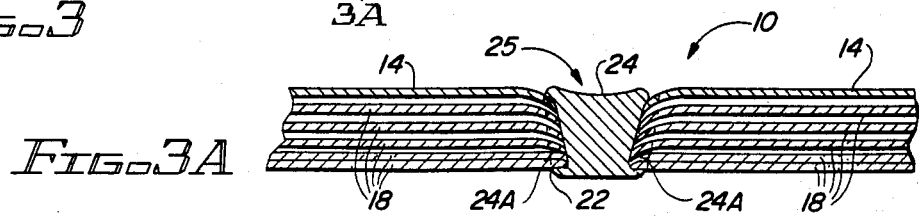
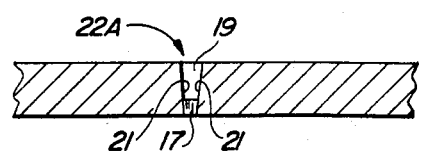
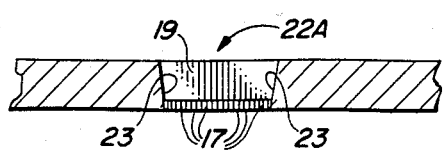
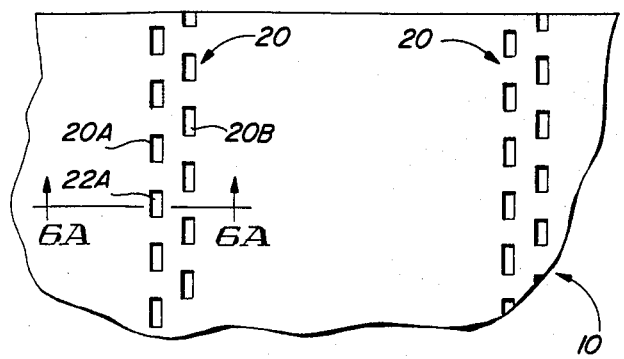

LAMINATION ANCHORING METHOD AND PRODUCT THEREOF

REFERENCE TO RELATED APPLICATION

This application is a continuation-in-part of co-pending Application Ser. No. 849,419, filed Apr. 8, 1986 and now U.S. Pat. No. 4,735,846.

BACKGROUND OF THE INVENTION

This invention relates to absorbent pads and, more particularly, to such pads which are used in packaging of meat products for absorbing liquids leaking therefrom and to the method of fabricating such pads.

Absorbent pads particularly designed for packaging with meats, poultry and fish food products are used in food markets, poultry processing plants and the like to reduce product display costs and to provide a cleaner, more attractive product. These pads are generally wrapped with the food product on the underside thereof to absorb liquids which may "bleed" from the product. In poultry products, for example, it is customary to place the poultry parts of a given package in a molded shallow tray of foamed plastic or the like. One of these absorbent pads is placed in the bottom of the tray and the poultry parts are placed thereon. The complete package is then wrapped with clear polyethylene or the like.

In one example of the prior art, such pads are constructed of layers of highly absorbent cellulose tissue. As many as 16 such layers may typically be laminated in a single pad. Such a pad also includes a polyethylene backing layer which repels moisture so that it cannot draw the natural juices from the meat product, and to prevent leakage from the pad of the liquid which is absorbed in the tissue layers. This polyethylene backing layer presents a particular problem, however, in that while it serves its intended purpose as used in the meat package, it exhibits an unfortunate tendency to delaminate during normal use. This is because the absorbed liquid in the tissue laminations weakens the attachment of the polyethylene backing layer to the tissue layers. The then-wet polyethylene layer tends to adhere to the adjacent meat product with which it is wrapped. As a result, when the housewife or other user of the packaged meat product removes the outer wrapping and lifts the meat product from its tray or other package support member, the polyethylene backing layer frequently sticks to the meat, resulting in dripping while it is being handled and requiring the consumer to perform the unpleasant task of manually removing this layer from the surface of the meat product before the product can be placed in the pan or other cooking utensil in which it is to be prepared.

In one particular product of the prior art which has been designed to avoid this problem, a pad is fabricated out of pulp positioned between two layers of plastic, at least one of which has perforations to permit moisture to absorb into the pulp core of the pad. The pad is fabricated with a laminated plastic edge extending about its periphery, the pulp being contained in the pocket or island defined and surrounded by the laminated plastic edge. Since this lamination is essentially waterproof, it tends to avoid the delaminating forces resulting from liquid being absorbed into the absorbent portion of the pad. As a consequence, the plastic layer adjacent the meat product is unlikely to adhere to the meat when the meat is removed from its packaging. However, other problems arise. The pulp may escape the perforations in one of the plastic layers which are provided to permit liquid to be absorbed in the pulp, thereby contaminating the meat. Also, if a side seam is not completely closed, loose pulp dust may permeate an entire case in shipment, thereby ruining the contents for their intended purpose.

What is needed is some way of strengthening or reinforcing the pressure adhesion bonds that are formed in the absorptive pads of the first type described hereinabove. In the example described, these bonds are formed by running a plurality of toothed or serrated wheels, having relatively narrow edges at their periphery, over the pads as they are being run through the production line. The pads are typically formed by production line equipment which draws pluralities of individual cellulose tissue layers from a plurality of rolls mounted in the fabrication equipment so that a continuous strip of laminated pad material is formed. This is then slit lengthwise and cut transversely to form individual pads in the selected sizes. During this fabrication process, and before the transverse cuts are performed, the strip is run over rollers against which a plurality of toothed wheels bear to develop a plurality of broken lines of pressure contacts which lightly adhere the absorbent cellulose tissue layers together and to the polyethylene backing layer. In some instances, polyethylene backing layers are installed on both sides of the cellulose tissue lamination, in which case the adherence extends between the polyethylene backing layers through the compressed tissue layers. As stated above, however, the bond which is formed in this manner and the nature of the product are such that the liquids absorbed in the pad weaken this bond and permit the upper polyethylene backing layer to delaminate and be removed from the package by adherence with the meat product.

SUMMARY OF THE INVENTION

In brief, arrangements in accordance with the present invention involve the addition of a water impervious, bond-preserving medium to the pressure-bond regions which are formed by the serrated wheels as described for the fabrication of the laminated pads of the first type described above. I have found that the use of a thermoplastic, low viscosity liquid, such as melted wax, paraffin, hot melt adhesive or the like, which is applied to the pressure bonded spots, formed as described above, results in an arrangement which protects the pad from delaminating when the laminated layers become wet. The mechanical bonding process renders the individual perforations permeable to the liquid by developing a myriad of tiny openings in each bonded spot. In using melted wax in this fashion, as by spraying on the juncture lines formed in the pad, it appears that the liquid penetrates the mechanical bond openings so that a slight amount is deposited on both sides of the laminated pad. Each bonded spot serves as a tiny funnel which directs the melted liquid to the bonded spot and retains it in the depression of the juncture line perforation so that it is absorbed into the laminated layers at the bonded spots. When the wax sets upon cooling, there is the effect of a "wax rivet". This not only serves to establish a holding force due to the solidified wax adhering to the opposite sides of the pad, as understood, but it also serves to coat and impregnate the individual layers of the pad, in the localized areas where the wax is applied, against penetration by the liquid which is absorbed in the pad adjacent the juncture lines. As a result of this protection against penetration of the absorbed liquid, the originally mechanically bonded spots are unaffected by the moisture in the pad and are thus not weakened from the original bonding strength as fabricated.

The principal advantage of this discovery is the capability of adding this protection against weakening of the mechanical laminating bonds by liquid absorbed into the pad without having to materially change the construction of the pad or the overall production process. Adding one or more stations at which the thermoplastic liquid is applied along the production line is simple to achieve, and the cost of the added liquid is negligible, since the quantity that must be applied to the juncture lines of a pad to develop the desired effect is insignificant.

Preferably, the thermoplastic liquid is applied to the laminated strip on the side of the outer polyethylene layer. It is of course preferred to apply the liquid after the juncture lines have been formed. In the case of pad material having polyethylene layers on both sides, it is desirable to apply the thermoplastic liquid to both polyethylene layers. This is accomplished in accordance with an aspect of the invention by running the continuous laminated strip over a roller following the spraying of the melted wax on what constitutes the upper side of the strip at the point of application. The roller serves to invert the strip so that the second polyethylene backing layer is now present on the upper side of the strip and a second liquid wax application is performed on the second side.

I have also found that excellent results may be obtained if the thermoplastic liquid is applied to the upper side of the bottom polyethylene layer, prior to its being brought into lamination with the tissue layers of the pad. The laminated structure as so assembled is then presented to the serrated wheels which penetrate the laminations from the upper side. A series of very effective bonds is formed in this fashion, each of the penetrations by the serrated wheels constituting the location of a "wax rivet" formed as described. Penetration of the laminated layers from the outside of the polyethylene layer after the thermoplastic liquid has been applied in the manner just described is to be avoided, since it has been found that heat from the thermoplastic liquid transfers to the serrated wheel used in this fashion, and results in the partial melting of the polyethylene layer and gumming up of the wheel from the plastic.

If it is desired to fabricate a laminated pad having polyethylene layers on both sides in accordance with this latest technique, an upper layer may be applied to the formed continuous laminated strip after application of the thermoplastic liquid to the inner side of the lower polyethylene layer but prior to presentation of the strip to the serrated wheels. Thus the complete set of laminations—upper and lower polyethylene layers and the tissue laminations between—are all perforated together at the single station where the serrated wheels are positioned. Thereafter, if desired, an additional application of thermoplastic liquid may be made from the upper side of the laminated strip, depositing the thermoplastic liquid into the perforations which form tiny funnels for the liquid, as previously described. In this manner, a "double wax rivet" is developed at each of the individual perforations. Only a single set of perforating wheels is required and the thermoplastic liquid is applied in two stages from the upper side of the respective surfaces without the need to invert the continuous strip during the fabrication process.

BRIEF DESCRIPTION OF THE DRAWING

A better understanding of the present invention may be had from a consideration of the following detailed description, taken in conjunction with the accompanying drawing in which:

FIG. 1 shows a prior art pad of the type first described above;

FIG. 2 shows a prior art pad of the second type described above;

FIG. 3 shows a cross section of a portion of a pad like that of FIG. 1 but with a mechanical laminating bond created in accordance with the present invention;

FIG. 3A is an enlarged view of the encircled portion of FIG. 3;

FIGS. 6A and 6B are enlarged orthogonal elevational views of one of the mechanical bond perforations created in a juncture line of the product of the invention;

FIG. 7 is an enlarged plan view of a portion of one particular embodiment of the present invention;

DESCRIPTION OF THE PREFERRED EMBODIMENTS

Figure 4:
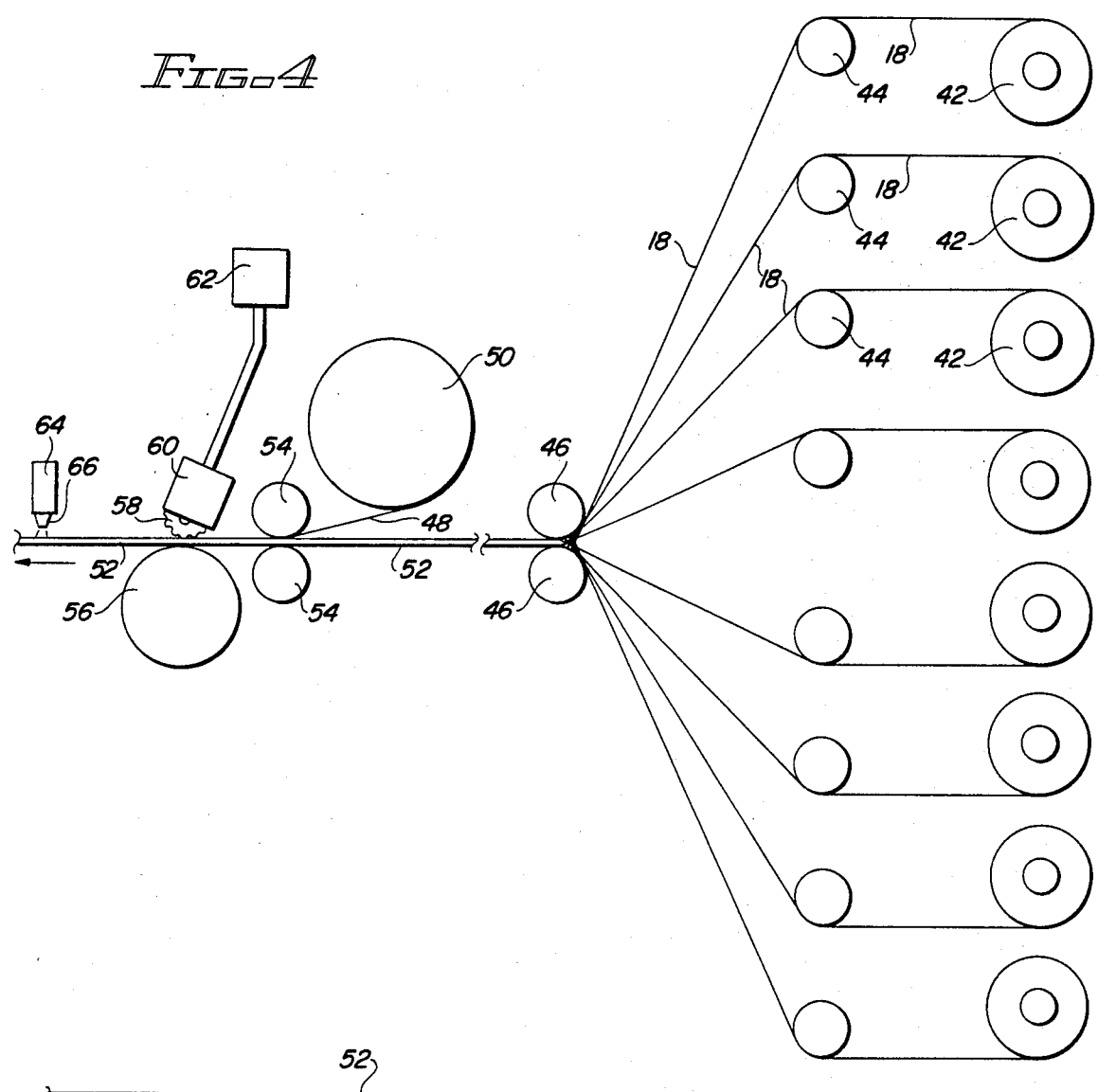
FIG. 4 is a schematic elevational view representing a portion of a production line used in the fabrication of products in accordance with the invention.

FIG. 1 schematically represents an existing prior art pad 10, shown partially broken away to illustrate the interior laminations. This pad may also represent an embodiment of the present invention, however, since such embodiment with wax added along the juncture lines, as described herein, cannot be visually distinguished from the prior art pad (on the scale shown in the figure).

The pad 10 includes peripheral edges 12 which are established by slitting and transverse cutting blades utilized in shaping the pad to the desired size after the laminations and juncture lines have been formed. One type of device which may be used on the production line for the purpose of cutting the pad material strips to pad size is the Model 654803 air operated, score-cut knife holder, using rotary knife wheels or blades, manufactured by John Dusenbery Company, Inc., of Randolph, N.J. The pad cutting process serves to form light seals along the peripheral edges 12, particularly where the pad may incorporate two plastic outer layers.

The pad 10 of FIG. 1 is further shown to comprise an upper plastic layer 14, a lower plastic layer 16, and a plurality (typically 16) of layers 18 of highly absorbent cellulose tissue. In FIG. 1, pad 10 is also shown with two juncture lines 20 (more can be provided, if desired). These juncture lines 20 extend longitudinally of the pad 10, separated generally equidistant between opposite side edges 12, and represent a series of individual pressure-bonded spots 22, typically developed by running the laminated pad material between a backing roll and a serrated or toothed wheel which bears against the roll. The force of a single tooth of this wheel squeezing the pad against the backing roll produces a single spot 22 which forms a light compression bond throughout the laminations. This bond is substantially incapable of withstanding the absorption of moisture into the layers of absorbent tissue making up a spot 22, and thus a pad of the prior art, such as is illustrated in FIG. 1, is subject to the problems regarding delamination which are described hereinabove.

FIG. 2 schematically represents another type of pad 30, also known in the art, which comprises a core region 32 which contains liquid-absorptive pulp, held therein by the peripheral laminated edge 34 which extends completely around the core region 32. The pad 30 has plastic layers above and below the pulp core, and these plastic layers are laminated under pressure or by heat sealing to form the peripheral boundary edges 34. The lower one of these plastic layers is perforated to permit liquid to reach the pulp within the core 32 for absorption. As noted hereinabove, the construction of the pad 30 of FIG. 2 is different from the pad 10 of FIG. 1 and is not suitable for all applications.

FIGS. 3 and 3A illustrate in cross section a portion of a pad of the type shown in FIG. 1, taken at a juncture line 20 and showing the addition of a minute amount of wax 24 added to pressure bond spot 22. The wax 24, applied in the manner to be described, is melted for application and is of low viscosity. It effectively penetrates all of the laminated layers of an individual spot 22 and encompasses the upper plastic layer 14 (and any additional plastic layer if such is provided on the side opposite the layer 14). When the wax 24 cools and solidifies, it effectively forms a "wax rivet" 25 which provides further structural integrity to the pressure bond formed at the spot 22 by the serrated wheel. A further beneficial effect results from the absorbed wax 24A rendering the immediately adjacent portions of the laminated cellulose layers 18 non-absorbent—i.e., impervious to the liquid which is absorbed into the remainder of the laminations 18, thereby protecting the bond at the spot 22 against the delaminating effect of the absorbed liquid. It will be noted that the pad 10 of FIG. 3 does not have a plastic layer 16 on the lower side.

FIG. 4 represents schematically portions of a production line for the fabrication of products in accordance with the present invention. This is not intended to show actual details of such a production line, which are known in the art, but merely indicates in schematic form sufficient elements thereof to provide an understanding of the addition of fabrication steps of the present invention.

In FIG. 4, a plurality of rolls 42 are shown, each providing a single layer of cellulose tissue 18 for a pad such as that shown in FIGS. 1 and 3. Each layer of tissue 18 is drawn from its corresponding roll 42, over a corresponding idler roll 44, and then, with the other layers 18, between a pair of rolls 46 which may serve to draw the individual lamination layers 18 long the production line.

The group of rolls 42, being eight in number, serves to provide half of the laminated layers to be incorporated in the finally produced pads. Another set of such rolls may be located downstream of the pair of rolls 46 in order to add another eight layers of cellulose tissue for incorporation in the finished pads.

When all the layers of cellulose tissue are in place and moving along the production line, as indicated in FIG. 4, another layer 48, this one being of polyethylene for the upper plastic layer of the finished pads, is drawn from a roll 50. If desired, a second plastic layer for the underside of the pad may be drawn from another roll like 50 which would be situated below the laminated strip 52. The thus-formed strip of laminated sheet material passes between rollers 54 and then to a station comprising a backing roll 56 and a toothed wheel 58 where individual compression bonded spots of longitudinal juncture lines (20 of FIG. 1) are formed. The serrated wheel 58 is mounted in a member 60 which is coupled to a control element 62 for developing the appropriate pressure of the wheel 58 against the backing roll 56.

Following the station where the pressure bonded spots are developed by the serrated wheel 58, the laminated sheet 52 reaches a station comprising a liquid wax spray applicator sprayer 64. Such applicators are well known in the art and generally comprise a heated reservoir for the melted wax or other thermoplastic substance, a nozzle 66 and a pneumatic connection for ejecting the melted wax through the nozzle 66. The nozzle 66 is positioned to apply minute amounts of the liquid wax to the individual pressure bonded spots developed by the serrated wheel 58. Since the cost of material for this application is negligible, the wax from the nozzle 66 may be applied as a continuous spray along the juncture line 20. Alternatively, if desired, it may be indexed to the rotation of the wheel 58 (by means not shown) so that the spray is rendered intermittent and applied only to the pressure bond spots 22 and not to the spaces between them along the juncture line 20.

Following the fabrication steps described, as represented in FIG. 4, the laminated sheet material is directed to slitting knives and transverse cutters to finish producing the pads in the desired dimensions—e.g., $4\frac{1}{4} \times 6\frac{1}{2}$ inches or any other size which may be desired. The cutting blades lightly adhere the laminations at all edges, but the wax impregnated bond spots of the juncture lines extending along the pad at spaced intervals develop the desired firm bonds capable of resisting the formerly delaminating effects of liquid absorbed into the cellulose tissues of the pad. It will be understood that the laminated sheet material may also be prepared for sale as such, generally in the form of long strips which are rolled for shipment. This form of the product is used by the manufacturers of lined trays which cut the strips themselves and provide them in an integral combination with a packing support tray. Thus the cutters need not be used this product.

For added strength of these bonds, it may be desirable to space the juncture lines in pairs, situated close together, as well as to have the wax applied from opposite sides of the pad in alternate juncture lines. This may be accomplished by the provision of additional stations of serrated wheels 58' and melted wax applicators 64' which are operative from the side of the laminated material sheet 52 which is opposite the previously described wheel 58 and wax applicator 64. Such an arrangement is shown schematically in FIG. 5 which depicts an inverting roll 57 which serves as a backing roll for a second serrated wheel 58'. A second wax applicator 64' with nozzle 66' is mounted following the station of the wheel 58' (in the direction of progression of the laminated sheet material 52) to apply a spray of melted wax to the juncture lines formed by the serrated wheel 58'. Since the sheet material 52 is inverted at this point, the pressure bond spots formed by the serrated wheel 58' are developed from the opposite side of the sheet material 52 (relative to those which are formed by the serrated wheel 58) and the wax applied by the nozzle 66' is also deposited from the opposite or underside. The wheel 58' and nozzle 66' are displaced slightly in the transverse direction of the sheet 52 from the position of the wheel 58 and nozzle 66. As a result, the juncture lines which are formed by these elements are close together but slightly displaced from each other. The result is a stronger laminating bond than would be the case if the juncture lines were spaced farther apart.

Figure 5:
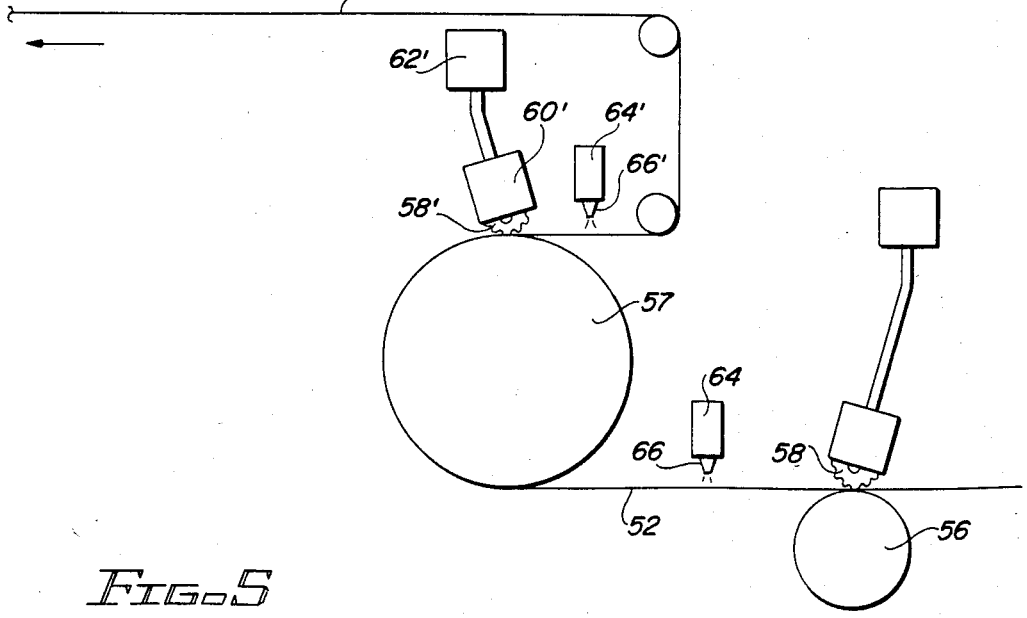
FIG. 5 is a schematic view of a portion of a production line for manufacturing an alternative version of the present invention.

It will be understood that each station of serrated wheels 58, 58' and spray applicators 64, 64' depicted in FIGS. 4 and 5 actually comprise pluralities of these elements arrayed side by side in banks extending in the transverse direction of the sheet material 52. Offset banks of wheels 58, 58' and applicators 64, 64' serve to form the bonded juncture lines in the manner described with a closer spacing than can be achieved by a single bank of wheels and sprayers.

The teeth of the serrated wheels pressing against the backing roll distort the lamination layers, including the plastic outer layer(s), to an extent that the layers are rendered somewhat permeable. The form of the mechanical bond formed by a single tooth of a serrated wheel is shown in the orthogonal sectional views of 6A and 6B. FIG. 6A shows a single perforation 22a of FIG. 7, taken along the line 6A—6A and looking in the direction of the arrows. FIG. 6B is a view of a single perforation 22a taken at right angles thereto.

As shown in FIGS. 6A and 6B, the perforations such as 22a are formed with angled side walls 21 and angled end walls 23. Because of the pressure exerted by the outer periphery of the serrated toothed wheel against the multi-layered sheet material, numerous tiny openings, indicated by the dots 17 at the bottom of the perforation 22a, are formed at the base of the depression. Thus, the walls 21, 23 can be considered to define a funnel 19 which is elongated in the tranverse dimension. The openings 17 serve as an outlet to the funnel 19. Accordingly, when melted wax is applied along a juncture line, as described, above some of the melted wax passes through the bottom layer and, when the wax solidifies, positively engages all layers in the lamination anchoring structure. For this reason, the wax structure 24, as shown in FIG. 3, is referred to as a "wax rivet" 25.

FIG. 7 is an enlarged view of a portion of a pad 10 which is formed in the manner described for the equipment of FIG. 5. In this figure, two pairs of juncture lines 20 are shown. Each pair comprises one line 20a formed from the upper side of the pad 10 and another line 20b being formed from the underside of the pad 10. These lines 20a, 20b are spaced closely together to provide improved bonding strength for the corresponding juncture line pair.

Figure 8:
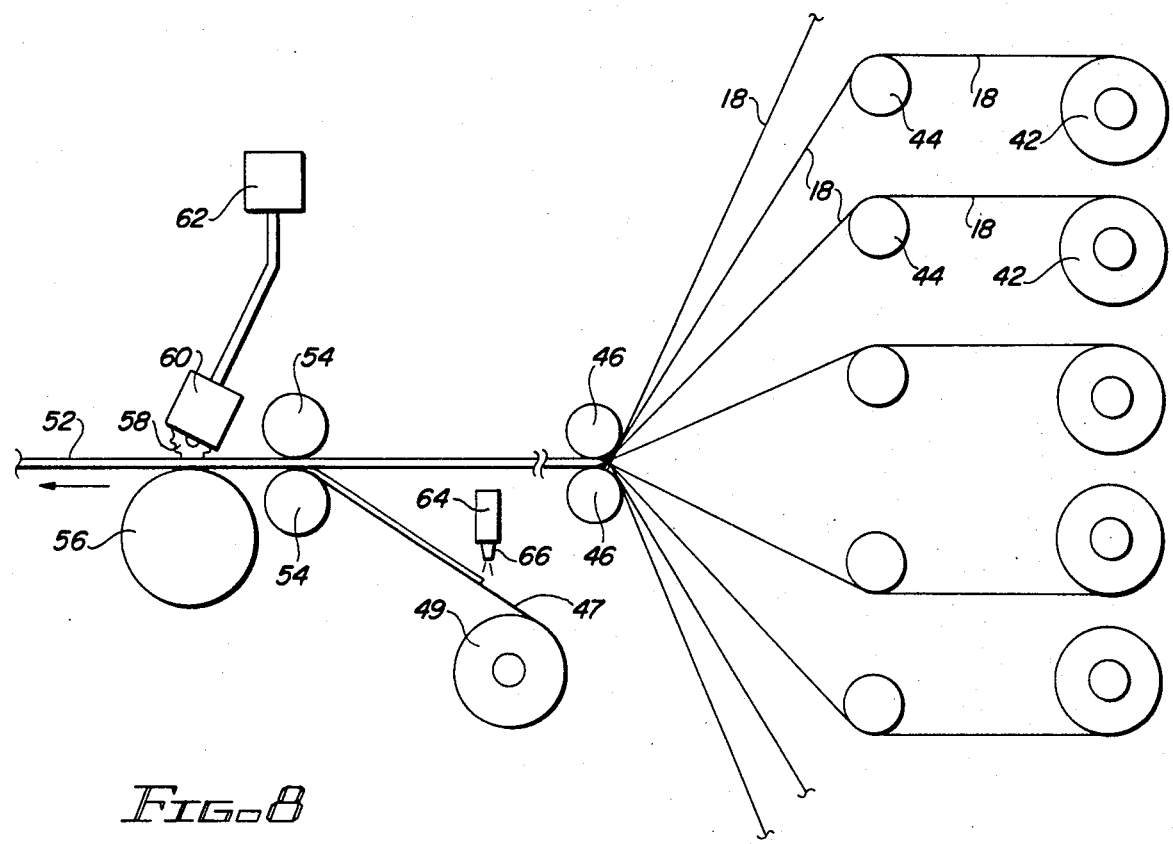
FIG. 8 is a schematic elevational view representing a portion of a production line for an alternative fabrication process in accordance with the invention.

FIG. 8 is an elevational schematic view of an alternative embodiment relative to those disclosed above. FIG. 8 is similar to FIG. 4, and like elements therein have been designated with like reference numerals. Thus, in the arrangement shown in FIG. 8, individual layers of cellulose tissue 18 are drawn from a plurality of corresponding supply rolls 42 over individual idler rollers 44 and then in an assembled set through the feed rolls 46 and on to a succeeding pair of feed rolls 54. In this embodiment, however, a polyethylene layer 47 is drawn from a supply roll 49 of polyethylene sheet to be joined with the assembled tissue layers feeding between the rollers 54. Between the supply roll 49 and the rollers 54 is a set of applicators for the melted wax or other thermoplastic liquid. One such applicator is shown comprising a sprayer or reservoir 64 and nozzle 66, operating in the manner previously described to apply a narrow line or series of dots, as desired, to the polyethylene layer 47 on the upper side thereof. Each individual nozzle 66 of the wax applicator device is in line with a corresponding individual serrated wheel 58 and support member 60 so that as the assembled layers of cellulose tissue 18 and polyethylene sheet 47 with the deposited thermoplastic liquid positioned between the polyethylene layer 47 and the adjacent tissue layer 18 proceed to the station where the serrated wheels 58 are located, individual wheels 58 pierce the laminations at points where the thermoplastic liquid is present, thereby developing the individual pressure bonded spots and reinforced "wax rivets". If only one polyethylene layer is to be included in the final laminated pads, the laminated sheet 52 which has been formed in the manner described in conjunction with FIG. 8 proceeds to the cutters and slitters for finishing into the individual pads.

Figure 9:
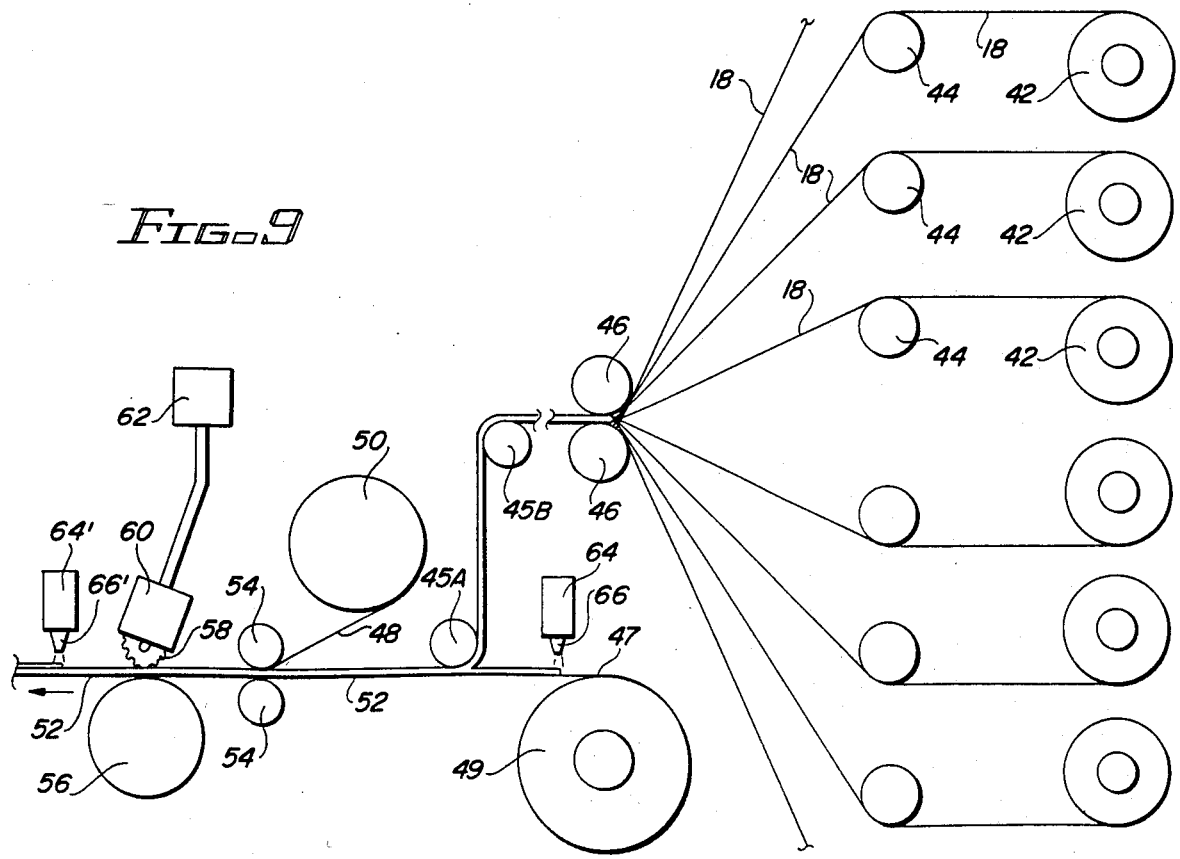
FIG. 9 is a schematic elevational view showing a variation of the arrangement of FIG. 8.

On the other hand, if a second layer of polyethylene is to be applied on the opposite side of the laminated sheet from the first polyethylene sheet (47 in FIG. 8) then the arrangement of FIG. 9 may be utilized to this purpose. FIG. 9 is like FIG. 8 insofar as the addition of a first polyethylene sheet 47, drawn from a supply roll 49 and receiving a line or dots of thermoplastic liquid from an applicator 64 via a nozzle 66 prior to joining a plurality of cellulose tissue layers 18 at idler roller 45A is concerned. In FIG. 9, additional idler rollers 45A and 45B are provided to accommodate the installation of the equipment for feeding and applying a thermoplastic liquid to the polyethylene layer 47. Assembling the cellulose tissue layers 18 from supply rolls 42 over idler rollers 44 and through feed rolls 46 is identical to the same process shown and described in connection with FIG. 8.

In the arrangement of FIG. 9, a second polyethylene layer 48 is drawn from a supply roll 50 to be placed on top of the assembled tissue layers 18 and lower polyethylene strip 47. This combination of laminated layers proceeds through the feed rolls 54 to the serrated wheel station 58 where it is perforated in the manner described with respect to FIG. 8. A series of bonded spots corresponding to the locations of the individual perforations is thus established in the manner previously described. However, the perforated sheet then proceeds to a second applicator station 64' where a second application of thermoplastic liquid is laid down via the nozzles 66'. This results in a "double rivet", wherein the application of thermoplastic liquid from the sprayers 64' overlies and reinforces the bonds previously developed from the thermoplastic liquid applied at the station 64 and compacted by the serrated wheels 58.

In the fabrication of laminated pads and sheet material in accordance with the present invention, the plastic layers of the laminated material are preferably provided with a Corna treatment, as is known in the art. This is an electric arc treatment which roughens the treated surface of the plastic layers and thus helps to bond the cellulose layers to the plastic by helping the laminating glue to adhere better to the surface of the plastic. This also serves to spread the wax which is applied in the tiny funnels of the perforated juncture lines, thereby taking more wax and providing better bonds at the individual pressure bond spots.

As a result of the fabrication method of the present invention, an economical but extremely effective product is provided in the form of an absorptive pad which is bonded in a manner similar to the pad of the prior art pad illustrated in FIG. 1 but which is capable of preserving the individual pressure bond spots of the pad against degradation from the effects of liquid which is absorbed in the pad during use. This improved pad substantially avoids the problem described above with respect to the prior art pads of the type illustrated in FIG. 1. This beneficial result is achieved in accordance with the invention without the necessity of modifying the construction to match that of the pad illustrated in FIG. 2, thus avoiding a substantial increase in the expense of fabrication of such pads. The amount of wax which is applied to the juncture lines of pads in accordance with the invention is so minute, and the cost of the added wax material is so insignificant, that the manufacturing cost per pad or per carton of pads is unchanged. Based on tests, approximately 25 cents worth of wax, paraffin, hot melt adhesive or other suitable thermoplastic material suitable for the purpose is enough to treat 2,000 of the 4¼×6½ inch pads mentioned above. Thus it may be seen that the cost per pad for realizing the improved embodiments of the present invention is truly insignificant.

The preferred embodiments described hereinabove have generally been discussed in terms of the use of melted wax as the material developing the improved bonds. However, it should be clearly understood that the invention is not limited to the use of wax but, indeed, any suitable thermoplastic, low viscosity wax-like substance may be used. The term "wax", as generally used herein will be understood to refer to a wax-like substance, which may include wax, paraffin, hot melt plastic adhesive, and the like. The wax-like substance may be applied as drops synchronized with the individual perforations of a juncture line, as a steady stream of melted substance along a juncture line, or as a focused and directed spray, to name a few examples.

Although there have been described above specific arrangements of a lamination anchoring method and product thereof in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. The method of bonding the laminations of an absorptive sheet comprising the steps of:
    assembling a plurality of absorptive layers and at least one plastic outer layer in close proximity to each other as laminations of sheet material;
    bonding said layers together at selected spots by selectively applying pressure through the thickness of the sheet material against a backing member to develop a plurality of pressure bonded spots; and
    applying a wax-like substance at an elevated temperature in liquid form at locations corresponding to said pressure bonded spots so that the liquid substance permeates the laminated layers in the immediate vicinity of said spots.

2. The method of claim 1 wherein the bonding step comprises running the sheet material between a backing member and a serrated wheel for developing longitudinal juncture lines in the material, each juncture line comprising a plurality of individual spots.

3. The method of claim 1 wherein the step of applying the wax-like substance comprises selectively spraying melted substance from a heated reservoir onto the upper side of the sheet material in line with said juncture lines.

4. The method of claim 1 wherein the step of applying the wax-like substance comprises selectively depositing melted substance from a heated reservoir onto the upper side of at least one layer of the sheet material along said juncture lines.

5. The method of claim 4 wherein the melted substance is deposited onto the upper side of a first plastic outer layer which is joined as the bottom layer of the laminated sheet material.

6. The method of claim 5 further including the steps of assembling a second plastic outer layer on the upper side of the laminated sheet material and selectively depositing additional melted substance from a heated reservoir onto the upper side of said second plastic outer layer to provide reinforcing bonds of thermo-setting compound at locations of said first-mentioned pressure bonded spots.

7. The method of claim 1 wherein the step of applying the wax-like substance comprises applying said substance to the upper side of a first plastic layer assembled as the bottom layer of the laminated sheet material, and further including the steps of assembling a second plastic layer along the upper side of the laminated sheet material and making a second application of liquid wax-like substance to provide reinforcements of the bonds initially developed at the pressure bonded spots.

8. The method of claim 4 wherein the substance is a wax having a low viscosity when melted and exhibiting high permeability in the absorbent layers of the laminated sheet material.

9. The method of claim 4 wherein the substance comprises paraffin.

10. The method of claim 4 wherein the substance comprises hot melt plastic.

11. The method of claim 4 wherein the laminated absorbent layers are cellulose tissue.

12. The method of claim 12 wherein two plastic backing layers are provided as outer layers on opposite sides of the laminated tissue layers.

13. The method of claim 4 wherein the step of applying the melted substance comprises applying said substance a second time onto the pressure bonded spots.

14. The method of claim 13 further including the steps of cutting the sheet material into individual pads, each including a significant plurality of wax-like substance-impregnated, pressure bonded spots at distributed locations in each individual pad.

15. The method of claim 4 wherein the bonding step further comprises forming a plurality of laterally elongated funnels extending from one surface layer of the sheet material to adjacent the opposite surface layer of the sheet material.

16. The method of claim 15 wherein the bonding step further comprises forming a myriad of tiny openings extending through the compressed laminations at the base of said funnel.

17. The method of claim 16 wherein the applying step comprises directing said substance in melted liquid form into said funnel in a second application.

18. The method of claim 17 wherein the second application of the applying step further comprises directing at least some of the melted liquid substance through said openings to develop a layer on the side of the sheet material remote from the funnel mouth.

19. The method of claim 18 further comprising the step of permitting the wax-like substance deposited within a funnel and extending through said openings to solidify in the form of a rivet.

20. An absorbent pad produced by the method of claim 5.

21. An absorbent pad produced by the method of claim 7.

22. An absorbent pad produced by the method of claim 19.

23. An absorbent laminated sheet comprising:
a plurality of individual absorbent tissue layers arranged as laminations in a stack;
a first plastic backing layer along one side of the laminated tissue layers with thermoplastic compound applied between the plastic backing layer and the adjacent tissue layer;
respective pluralities of pressure bonded spots arranged in juncture lines extending along said sheet, each bonded spot comprising said tissue layers and said backing layer being compressed tightly together in a localized region to form a compression bond; and
means including said compound for structurally reinforcing the compression bond formed at an individual spot.

24. The sheet of claim 23 wherein said reinforcing means comprise a thermoplastic compound in solid form.

25. The sheet of claim 24 wherein said thermoplastic compound permeates the tissue layers making up the compression bond in the immediate vicinity of said spot.

26. The sheet of claim 24 wherein said thermoplastic compound comprises wax.

27. The sheet of claim 26 wherein said wax is present in the form of a "wax rivet" bonding the outer layers and at least some of the layers in between.

28. The sheet of claim 24 wherein said thermoplastic compound comprises a wax-like substance.

29. The sheet of claim 24 wherein said thermoplastic compound comprises paraffin.

30. The sheet of claim 24 wherein said thermoplastic compound comprises hot melt plastic.

31. The sheet of claim 27 wherein said wax is present in the form of a "wax rivet" bonding together the uppermost layer and the bottom most layer of the laminated sheet.

32. The sheet of claim 24 further comprising juncture lines arranged closely together in adjacent pairs, the compression bonded spots of the lines of a given pair being formed from opposite sides of the sheet.

33. The sheet of claim 32 wherein the thermoplastic compound of the compression bonded spots of the junction lines of a pair is applied from opposite sides of the pads.

34. The sheet of claim 23 wherein the pressure bonded spots are in the form of laterally elongated funnels aligned in said juncture lines and having a myriad of tiny openings extending through the sheet in a localized region at the base of a funnel.

35. The sheet of claim 34 wherein the structurally reinforcing means comprise a solidified wax-like substance substantially located within said funnel.

36. The sheet of claim 34 wherein the structurally reinforcing means comprise a solidified wax-like substance in the form of a rivet situated partially within said funnel and encompassing both opposed surfaces of the sheet.

37. The sheet of claim 23 wherein the compression bonded spots are formed by perforating the laminations from the side remote from the plastic backing layer.

38. The sheet of claim 37 further including a second plastic layer arrayed along the side of the laminated stack remote from the first plastic layer, said compression bonds being formed by perforating the laminated stack from the side adjacent the second plastic layer.

39. The sheet of claim 38 wherein the reinforcing means comprise a second application of thermoplastic compound at the originally formed individual spots.

40. Apparatus for bonding together the individual layers of an absorbent laminated sheet to make the sheet resistant to delaminating when wet comprising:
means for assembling a plurality of individual layers in a laminated sheet including means for assembling a first plastic layer along the underside of the laminated sheet;
means for establishing a plurality of compression bonds throughout the individual layers at selected spots along the sheet; and
means for selectively applying a thermoplastic compound in a liquid state to the upper side of the plastic layer in line with said spots prior to assembly thereof with the other layers in the laminated sheet in order to render said spots water repellent.

41. The apparatus of claim 40 wherein said bond establishing means comprise a rotatable serrated wheel having projecting teeth for compressing the layers at successive points of contact with the teeth.

42. The apparatus of claim 41 wherein the selectively applying means comprise means for spraying melted thermoplastic compound along a path tracked by the serrated wheel.

43. The apparatus of claim 41 wherein the selectively applying means comprise means for depositing melted thermoplastic compound intermittently along a path tracked by the serrated wheel.

44. The apparatus of claim 43 wherein the selectively applying means comprise means for depositing melted thermoplastic compound only in depressions established by the teeth of the serrated wheel.

45. The apparatus of claim 40 wherein the assembling means further include means for assembling a second plastic layer as an upper layer of said laminated sheet prior to presenting the laminating sheet to said bond establishing means.

46. The apparatus of claim 45 wherein said applying means further comprise means for applying the compound from the upper side of the second plastic layer in positions corresponding to the initially established compression bonds to provide a further reinforcement of said bonds.

* * * * *